L. L. CHASE.
COMBINATION COOKER.
APPLICATION FILED DEC. 23, 1907.
899,244.
Patented Sept. 22, 1908.
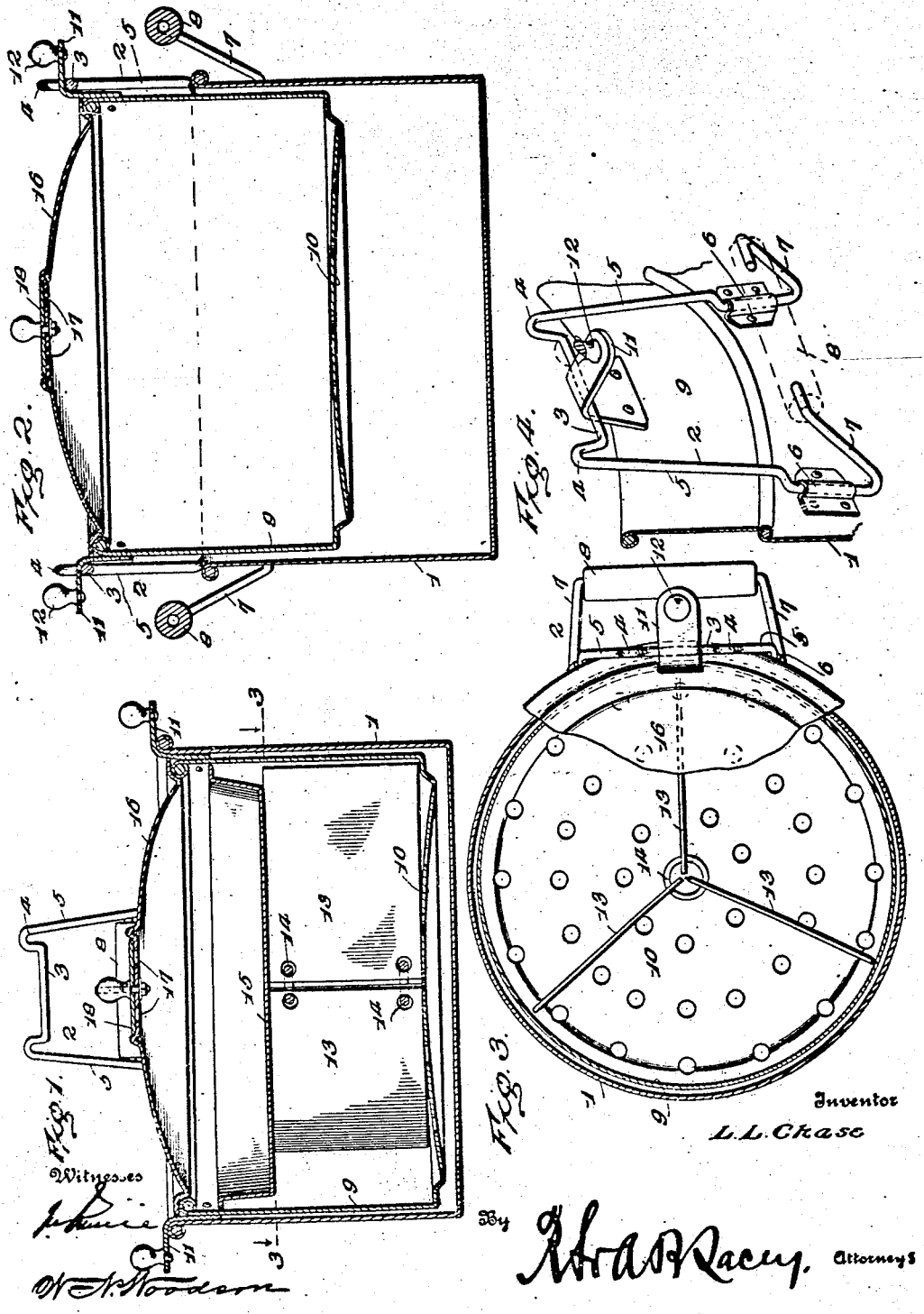
Inventor
L. L. Chase

UNITED STATES PATENT OFFICE.

LEE L. CHASE, OF NORTH SPRINGFIELD, VERMONT.

COMBINATION-COOKER.

No. 899,244.

Specification of Letters Patent.

Patented Sept. 22, 1908.

Application filed December 23, 1907. Serial No. 407,779.

*To all whom it may concern:*

Be it known that I, LEE L. CHASE, citizen of the United States, residing at North Springfield, in the county of Windsor and State of Vermont, have invented certain new and useful Improvements in Combination-Cookers, of which the following is a specification.

This invention comprehends certain new and useful improvements in culinary devices or utensils, and the invention has for its object a simple and efficient construction of combination cooker and steamer, the parts of which are so arranged that articles after being cooked may be allowed to drain and be kept warm until desired for use without evaporation or drying up.

With these and other objects in view, the invention consists in certain constructions, arrangements and combinations of the parts that I shall hereinafter fully describe and claim.

For a full understanding of the invention, reference is to be had to the following description and accompanying drawings, in which:

Figure 1 is a sectional view of my improved cooking apparatus; Fig. 2 is a similar view on a larger scale, showing the inner vessel raised or partially withdrawn from the main vessel and resting on the brackets thereof; Fig. 3 is a horizontal sectional view on the line 3—3 of Fig. 1; and, Fig. 4 is a detail perspective view of one of the brackets hereinafter specifically described.

Corresponding and like parts are referred to in the following description and indicated in all the views of the drawings by the same reference characters.

The main or outer vessel 1 of my improved combination cooker and steamer is provided at substantially opposite points with two frame-like brackets 2 which project upwardly a predetermined distance above the rim of the said vessel. In the preferred construction of the brackets, they are each formed of a single piece of suitably strong wire, the intermediate portion of which extends in a horizontal plane, as indicated at 3 and is then crimped as indicated at 4, whereby to provide the two upwardly facing sockets of the brackets. The ends of the wires are then extended downwardly from the crimped portions 4 to form the slightly upwardly converging supporting arms 5 of the brackets, said arms being secured at their lower ends in straps 6 riveted or otherwise attached to the sides of the vessel 1. The ends of the wire are then bent sharply upward and outward to form fingers 7, said fingers being provided with inturned extremities as shown, engaging the ends of handles 8 that are preferably of the ordinary hollow wooden type. Preferably the fingers 7 terminate below the planes of the upper ends of the brackets, as clearly illustrated in the drawing, so that the said handles may be grasped, without danger of a person's hands or fingers coming in contact with the upper cross bars of the brackets or parts supported therein.

9 designates the inner vessel of my improved cooking apparatus, the same being provided with a perforated bottom 10 and at its right upper rim or edge with two ears 11 attached thereto at diametrically opposite points and extending outwardly as shown. The knob-like or other handles 12 are secured in the outwardly projecting portions of said ears.

In connection with these two main parts of the cooking apparatus, my invention embodies a folding and removable partition which consists of a plurality of plates 13, three in number in the present instance, that are all pivotally connected together at one edge by rings 14 as shown and that are designed to be stood on edge within the inner vessel 9 to divide the same into a series of compartments in case several kinds of food are to be cooked at the same time in such vessel. If desired, these compartments may be covered by a dish or false lid 15, which may form another compartment or receptacle for holding food to be cooked.

16 designates the main lid or cover of the apparatus which is provided with one or more orifices 17 for the outlet of steam, said orifices being controlled by a damper 18, as shown.

As an example of the practical use of my improved combination cooker and steamer, it may be stated that the inner vessel with the perforated bottom is lowered into the main or outer vessel and sufficient water is poured in to cover the articles to be cooked. When the cooking operation has been completed, the inner vessel 9 is raised or partially withdrawn from the main or outer vessel and turned so that its ears 11 will rest in the sockets 3 of the frame-like brackets 2 of the outer vessel. In this position, it is obvious that the food will drain instantaneously and perfectly without danger of hot steam or any loss of contents, and in this position of the inner vessel, the food may be kept warm for a considerable time without evaporation or drying up.

From the foregoing description in connection with the accompanying drawings, it will be seen that I have provided a very simple and efficient combination cooker and steamer of comparatively few parts that may be cheaply manufactured and in the operation of which the food may be cooked more quickly than in the ordinary kettle, because of the large heating surface provided, the food being cooked without danger of burning or without the danger of the vessel boiling over, as steam can be permitted to escape through the orifices 18. It is of course manifest that the perforated bottom of the inner vessel 9 may be used as a colander or sieve, as well as for its primary use of permitting the steam to pass therethrough.

Having thus described the invention, what is claimed as new is:

1. A culinary apparatus of the character described, comprising a main vessel, supporting brackets secured to the rim portion of said vessel at opposite sides thereof and consisting of horizontally extending intermediate portions, supporting arms extending downwardly therefrom, upwardly extending fingers projecting from the lower ends of said arms, handles secured to the extremities of said fingers, and an inner vessel adapted to be inserted in the main vessel and provided with outstanding ears adapted to rest on the horizontally extending portion of said brackets.

2. A culinary apparatus of the character described, comprising a main vessel, brackets secured to the vessel at opposite sides thereof and projecting upwardly therefrom, said brackets embodying supporting arms, upwardly extending fingers terminating in planes below the planes of the upper ends of the brackets, handles secured to the ends of said fingers, and an inner vessel adapted to be inserted in the main vessel and provided with outstanding ears adapted to rest on the said brackets.

In testimony whereof I affix my signature in presence of two witnesses.

LEE L. CHASE. [L. S.]

Witnesses:
ANNA T. FIELD,
BERTHA I. FIELD.